(12) United States Patent
Cech

(10) Patent No.: US 11,752,971 B2
(45) Date of Patent: Sep. 12, 2023

(54) ADAPTIVE ANCHORING DEVICE

(71) Applicant: Joyson Safety Systems Acquisition LLC, Auburn Hills, MI (US)

(72) Inventor: Len Cech, Auburn Hills, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 17/562,575

(22) Filed: Dec. 27, 2021

(65) Prior Publication Data

US 2022/0203927 A1 Jun. 30, 2022

Related U.S. Application Data

(60) Provisional application No. 63/132,245, filed on Dec. 30, 2020.

(51) Int. Cl.
*B60R 22/26* (2006.01)
*B60R 22/48* (2006.01)

(52) U.S. Cl.
CPC ...... *B60R 22/26* (2013.01); *B60R 2022/4808* (2013.01)

(58) Field of Classification Search
CPC . B60R 2022/025; B60R 22/10; B60R 22/105; B60R 22/1955; B60R 22/18; B60R 22/26; B60R 2022/485; B60N 2/2893; B60N 2/26; B60N 2/2803

See application file for complete search history.

(56) References Cited

U.S. PATENT DOCUMENTS

| | | | |
|---|---|---|---|
| 8,469,400 B2 * | 6/2013 | Merrill | B60N 2/24 297/480 |
| 10,252,640 B2 | 4/2019 | Cech | |
| 2005/0082103 A1 * | 4/2005 | Garcia | B60N 2/2893 180/272 |
| 2006/0049929 A1 * | 3/2006 | Lawrence | B60N 2/2887 340/457 |
| 2010/0109395 A1 * | 5/2010 | Ruthinowski | F16F 7/09 267/140.13 |
| 2016/0304004 A1 * | 10/2016 | Sandbothe | B60R 21/013 |
| 2018/0056821 A1 * | 3/2018 | Konrad | B60N 2/2893 |
| 2021/0009077 A1 * | 1/2021 | Golm | B60R 22/48 |
| 2021/0300275 A1 * | 9/2021 | Thomas | B60R 21/01516 |

FOREIGN PATENT DOCUMENTS

| | | | | |
|---|---|---|---|---|
| JP | 2001105940 A | * | 4/2001 | |
| JP | 2001121997 A | * | 5/2001 | |
| WO | WO-2013055810 A1 | * | 4/2013 | ............. B60N 2/002 |
| WO | WO-2014132517 A1 | * | 9/2014 | ........... B60N 2/2881 |

* cited by examiner

*Primary Examiner* — Paul N Dickson
*Assistant Examiner* — Matthew D Lee
(74) *Attorney, Agent, or Firm* — Meunier Carlin & Curfman LLC

(57) ABSTRACT

Various implementations include a child restraint anchoring system. The system includes one or more anchors configured for coupling to a support frame of a vehicle seat. The one or more anchors are automatically movable from a retracted position to an extended position. The one or more anchors are closer to the support frame in the retracted position than in the extended position.

27 Claims, 3 Drawing Sheets

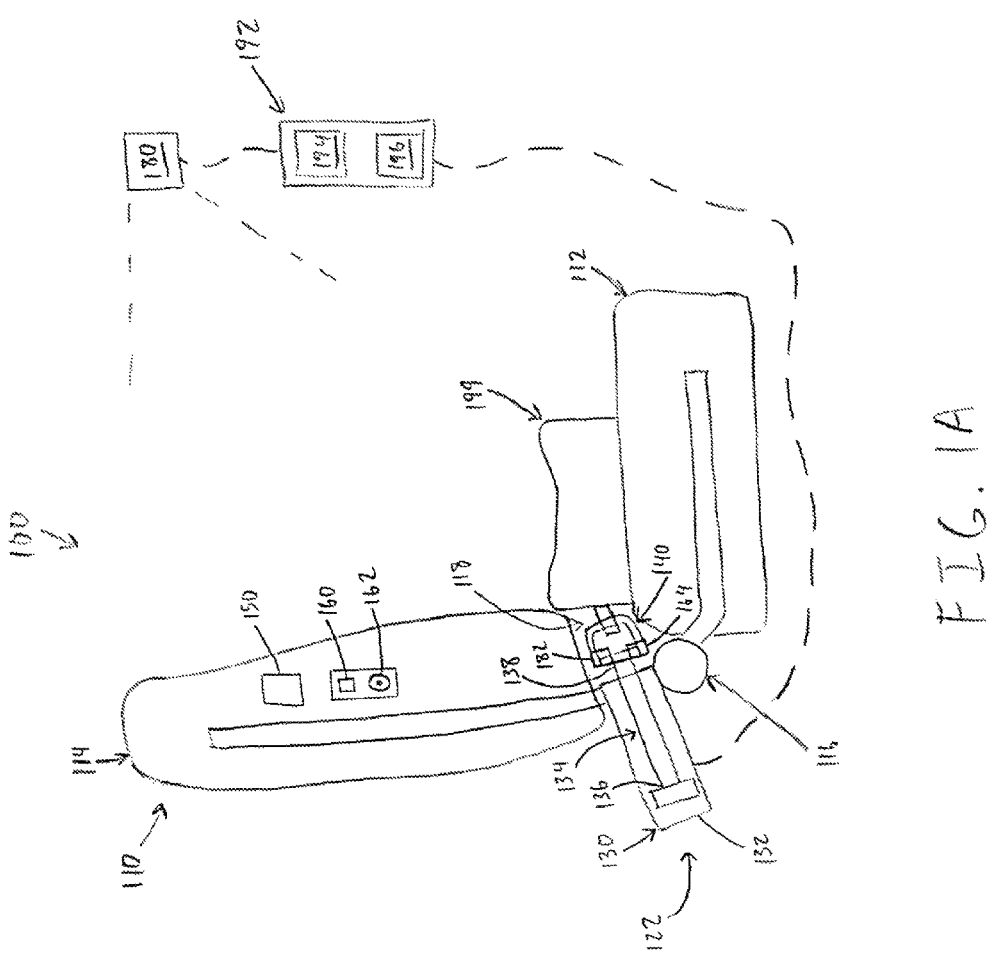

ADAPTIVE ANCHORING DEVICE

CROSS-REFERENCE TO RELATED APPLICATIONS

This application claims the benefit of U.S. Provisional Patent Application No. 63/132,245, filed Dec. 30, 2020, the contents of which are incorporated herein by reference in their entirety.

BACKGROUND

Various systems and methods have been utilized to couple a child restraint system ("CRS") to a seat in a vehicle, including universal child restraint anchorage systems. The International Standards Organization ("ISO") and National Highway Traffic Safety Administration ("NHTSA") developed ISOFIX (ISO 1999a, 13216) as the international standard for attachment points for child seats in passenger cars. Referred to as LATCH ("Lower Anchors and Tethers for Children") in the US and UAS ("Universal Anchorage System") in Canada, ISOFIX provides guidelines for standard attachment points that can be used to secure a child seat to the vehicle seat. ISOFIX requires two lower attachment members and a mechanism to "limit pitch rotation of the child restraint."

Typically, these systems include two ISOFIX anchors, which are U-bolts rigidly mounted to the seat frame. A user aligns and couples attachment mechanisms (e.g., clips) coupled to the CRS to the ISOFIX anchors. The ISOFIX anchors may be disposed at the vehicle seat bight (intersection between the bottom vehicle seat cushion and the back cushion), on the seat top, or behind the seat. The effectiveness of the CRS to mitigate child injuries in high dynamic events (e.g., pre-crash braking and or crash impacts) is directly linked to the rigid connection of the CRS to the ISOFIX anchors.

When the ISOFIX anchors are disposed within the vehicle seat bight, accessing the ISOFIX anchors to couple and decouple the CRS is often difficult (e.g., due to the limited spatial access). Also, there is a wide variation in child restraint systems, including variations in the attachment mechanisms for coupling to the ISOFIX anchors. And, the user is responsible for ensuring that the CRS attachment mechanisms are firmly attached to the ISOFIX anchors.

Thus, a need exists for a child restraint anchoring system that allows a user to couple and decouple a CRS with a child restraint anchoring system more easily and reliably.

SUMMARY

Various implementations include a child restraint anchoring system. The system includes one or more anchors configured for coupling to a support frame of a vehicle seat. The one or more anchors are automatically movable from a retracted position to an extended position. The one or more anchors are closer to the support frame in the retracted position than in the extended position.

In some implementations, the system further includes one or more linear actuators for coupling the one or more anchors to the support frame. The one or more linear actuators cause the one or more anchors to move between the retracted position and the extended position.

In some implementations, the system further includes one or more worm gear systems for coupling the one or more anchors to the support frame. The one or more worm gear systems cause the one or more anchors to move between the retracted position and the extended position.

In some implementations, each of the one or more anchors comprises an ISOFIX U-bolt.

In some implementations, the system further includes at least one sensor and a processor in electrical communication with the at least one sensor and a memory. The processor executes computer-readable instructions stored on the memory. The instructions cause the processor to receive sensor data from the at least one sensor, determine whether a child restraint system ("CRS") is properly coupled to the one or more anchors based on the received sensor data, and indicate whether the CRS is properly coupled to the one or more anchors. In some implementations, the indication of whether the CRS is properly coupled to the one or more anchors is an audible indication. In some implementations, the indication of whether the CRS is properly coupled to the one or more anchors is a visible indication.

In some implementations, after the instructions cause the processor to determine whether the CRS is properly coupled to the one or more anchors based on the received sensor data, the instructions further cause the processor to indicate whether the one or more anchors are in the extended position or the retracted position. In some implementations, the indication of the extended position or retracted position of the one or more anchors is an audible indication. In some implementations, the indication of the extended position or retracted position of the one or more anchors is a visible indication. In some implementations, the indication of the extended position or retracted position of the one or more anchors is a haptic indication.

In some implementations, the at least one sensor comprises a force sensor. In some implementations, the at least one sensor comprises an imaging unit. In some implementations, the imaging unit comprises a camera.

In some implementations, the one or more anchors are moved between the retracted position and the extended position in response to receiving input from a user.

In some implementations, the system further includes at least one sensor and a processor in electrical communication with the at least one sensor and a memory. The processor executes computer-readable instructions stored on the memory. The instructions cause the processor to receive sensor data from the at least one sensor, determine whether a child restraint system ("CRS") is properly coupled to the one or more anchors based on the received sensor data, and, in response to the CRS being properly coupled to the one or more anchors, move the one or more anchors from the extended position to the retracted position.

In some implementations, the system includes at least one imaging unit. The instructions cause the processor to further determine whether a person is located within a predetermined distance of the one or more anchors, and the instructions cause the processor to move the one or more anchors from the extended position to the retracted position only if the person is not located within the predetermined distance of the system. In some implementations, the imaging unit includes a camera.

In some implementations, movement of the one or more anchors from the extended position to the retracted position rigidly couples the CRS to the seat.

In some implementations, the system further includes a processor in electrical communication with a memory. The processor executes computer-readable instructions stored on the memory. The instructions cause the processor to determine whether a child restraint system ("CRS") coupled to the one or more anchors is in a safe condition to be uncoupled from the one or more anchors, and, in response to the CRS being in a safe condition to be uncoupled from the one or more anchors, move the one or more anchors from the retracted position to the extended position.

In some implementations, determining whether the CRS is in a safe condition to be uncoupled from the one or more anchors is based on whether a vehicle including the system is located at its intended destination. In some implementations, determining whether the CRS is in a safe condition to be uncoupled from the one or more anchors is based on whether a vehicle including the system is stationary. In some implementations, determining whether the CRS is in a safe condition to be uncoupled from the one or more anchors based is on whether the vehicle is in park.

In some implementations, the system further includes a processor in electrical communication with a memory. The processor executes computer-readable instructions stored on the memory. The instructions cause the processor to determine whether a child restraint system ("CRS") coupled to the one or more anchors should be uncoupled from the one or more anchors, and, in response to determining that the CRS should be uncoupled from the one or more anchors, cause the CRS and the one or more anchors to uncouple from each other.

In some implementations, determining whether the CRS should be uncoupled from the one or more anchors is based on whether the vehicle is located at its intended destination. In some implementations, determining whether the CRS should be uncoupled from the one or more anchors is based on whether the vehicle is stationary. In some implementations, determining whether the CRS should be uncoupled from the one or more anchors is based on whether the vehicle is in park.

In some implementations, the system transmits a signal to the CRS to cause the CRS and the one or more anchors to uncouple from each other.

BRIEF DESCRIPTION OF DRAWINGS

Example features and implementations are disclosed in the accompanying drawings. However, the present disclosure is not limited to the precise arrangements and instrumentalities shown.

FIG. 1A is a side view of a child restraint anchoring system in the retracted position, according to one implementation.

DETAILED DESCRIPTION

Various implementations of the devices, systems, and methods described herein include a child restraint anchoring system that includes one or more anchors that are movable from a retracted position (e.g., in which the anchors are disposed within the vehicle seat bight) and an extended position (e.g., in which the anchors are extended out of the vehicle seat bight), and vice versa. The system includes a drive system for moving the anchors between the extended position and the retracted position. The system uses sensor data and/or user input, for example, to automatically cause the drive system to move the anchors between positions, according to some implementations.

Various implementations of the devices, systems, and methods described herein make coupling attachment mechanisms of child restraint systems to ISOFIX anchors easier and more reliable. In particular, as ride share services grow in use and fully autonomous vehicles (SAE automation level 4+) are introduced, fast and reliable access to ISOFIX anchors in vehicles becomes more critical. For example, in some implementations, the devices, systems, and methods described herein can be applied to any type of vehicle seat (e.g., airplanes, bus, train, automobile) in which a remote sensing cabin monitoring system is used to monitor occupancy on the vehicle seat and is capable of distinguishing a CRS placed on the vehicle seat.

According to various implementations, a child restraint anchoring system includes one or more anchors configured for coupling to a support frame of a vehicle seat. The one or more anchors are automatically movable between a retracted position and an extended position. The one or more anchors are closer to the support frame in the retracted position than in the extended position.

Figure 1B:
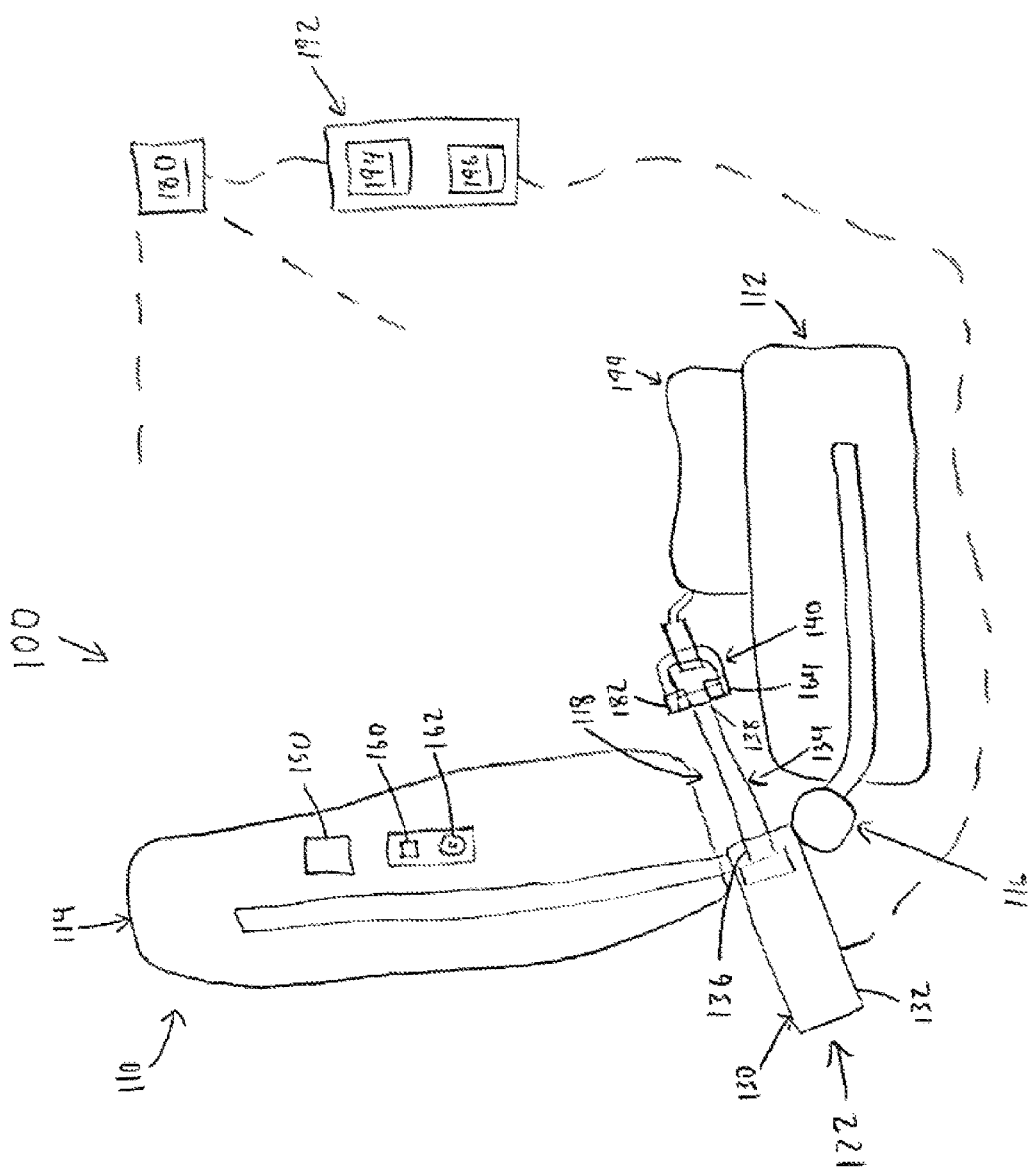
FIG. 1B is a side view of the child restraint anchoring system shown in FIG. 1A in the extended position.

FIGS. 1A and 1B show a child restraint anchoring system 100 according to one implementation. The system 100 includes two ISOFIX anchors 140, a drive system 122, sensors 180, 182, a switch 150, indicators 160, 162, 164, and a controller 192.

The system 100 is coupled to the support frame 116 of a vehicle seat 110. The seat 110 has a seat base 112, a seat back 114 coupled to the seat base 112, and a support frame 116 extending throughout the seat base 112 and seat back 114. The intersection between the seat base 112 cushion and the seat back 114 cushion defines a gap called the vehicle seat bight 118.

The drive system 122 includes two linear actuators 130 (shown in FIGS. 1A and 1B aligned with each other). Each of the linear actuators 130 includes a hollow cylindrical housing 132 and a piston rod 134 extending from one axial end of the housing 132. The housing 132 of each of the linear actuators 130 is coupled to a portion of the support frame 116 of the seat 110 adjacent the vehicle seat bight 118. The piston rod 134 has a proximal end 136 disposed within the housing 132 and a distal end 138 opposite and spaced apart from the proximal end 136 such that the distal end 138 of the piston rod 134 is disposed external to the housing 132. The piston rod 134 is slidable within the housing 132 from a retracted position, shown in FIG. 1A, to an extended position, shown in FIG. 1B. The distal end 138 of the piston rod 134 is closer to the support frame 116 in the retracted position than in the extended position.

Figure 2B:
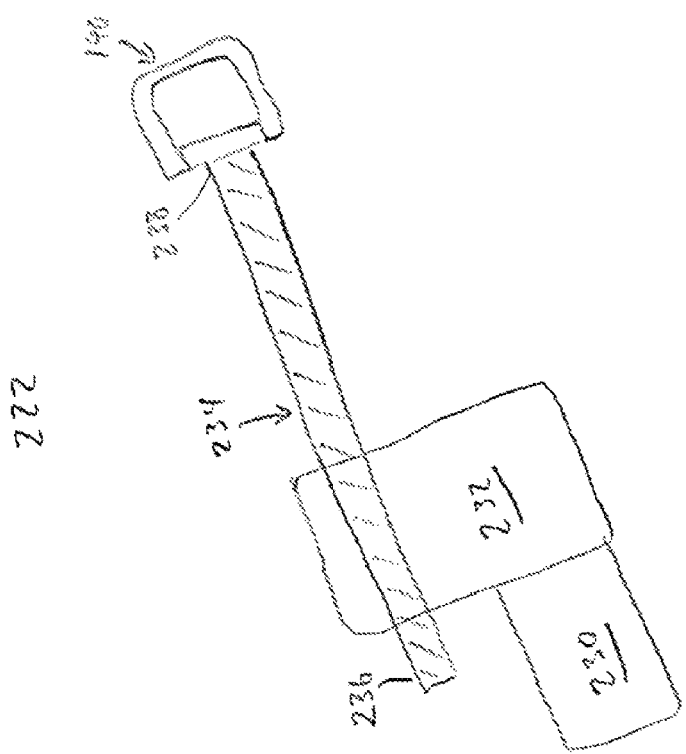
FIG. 2B is a side view of the drive system of the child restraint anchoring system shown in FIG. 2A in the extended position.

Each of the two anchors 140 is a steel ISOFIX U-bolt (shown in FIGS. 1A and 2B aligned with each other). Each of the anchors 140 is coupled to, and movable with, the distal end 138 of the piston rod 134 of one of the linear actuators 130. Thus, movement of the linear actuators 130 from the retracted position to the extended position moves each of the anchors 140 from the retracted position to the extended position. The anchors 140 are also closer to the support frame 116 in the retracted position than in the extended position. In the extended position, the attachment mechanisms (e.g., clips) of a child restraint system 199 ("CRS") are outside of the vehicle bight and can be coupled to the anchors 140 more easily to rigidly and reliably couple the CRS 199 to the seat 110 of the vehicle.

Figure 2A:
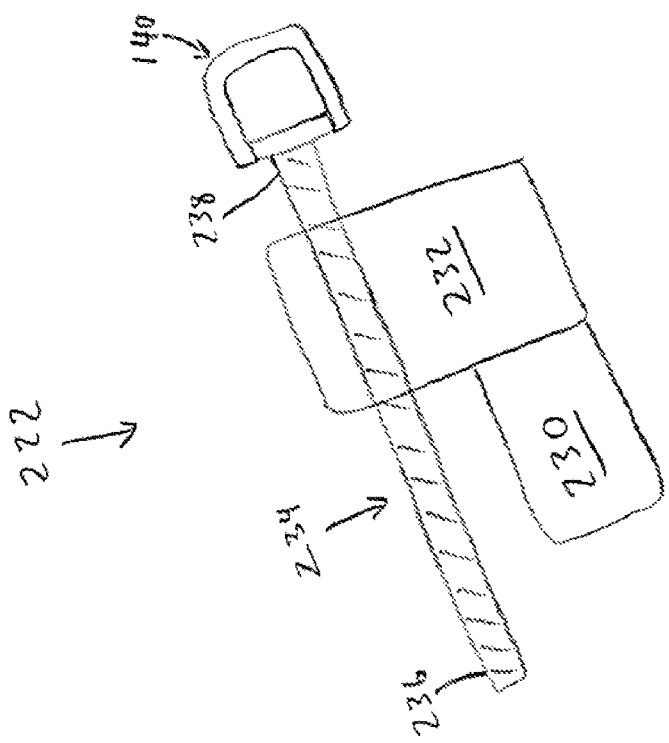
FIG. 2A is a side view of a drive system of a child restraint anchoring system in the retracted position, according to another implementation.

FIGS. 2A and 2B show another example implementation of a drive system 222 that can be used in a child restraint anchoring system like the child restraint anchoring system 100 shown in FIGS. 1A and 1B. The drive system 222 includes two worm gears 232, two threaded rods 234, and two motors 230 each configured to drive one of the worm gears 232. Each of the threaded rods 234 has a proximal end 236 and a distal end 238 opposite and axially spaced apart from the proximal end 236. Each of the threaded rods 234 is disposed within one of the worm gears 232 such that the distal end 238 of the threaded rod 234 is closer to the vehicle seat bight 118 defined between the seat base 112 and the seat back 114. One of the two anchors 140 is coupled to the distal end 238 of each of the threaded rods 234. Each worm gear 232 is configured to engage the threads of the respective threaded rod 234 such that, when the motor 230 drives the worm gear 232 in a first direction, the worm gear 232 causes the respective threaded rod 234 and anchor 140 to move from the retracted position, shown in FIG. 2A, to the extended position, shown in FIG. 2B. When the motor 230 drives the worm gear 232 in a second direction, the worm gear 232 causes the threaded rod 234 and anchor 140 to move from the extended position back to the retracted position.

Although the drive systems 122, 222 shown in FIGS. 1 and 2 include linear actuators 130 and worm gears 232, respectively, in other implementations, the drive system includes servo motors, motors, pulley and cable systems, cam systems, guide rail and bearing systems, guide pin and guide systems, or any combination of one or more of these or any other devices or systems capable of automatically moving the anchors between the retracted position and the extended position.

The two sensors included in the system 100 shown in FIGS. 1A and 1B are a camera 180 and a force sensor 182. The camera 180 captures image data, and the force sensor 182 captures force data. The camera 180 is disposed within the cabin of the vehicle and oriented such that the camera 180 is facing the seat 110 in which the drive system 122 and anchors 140 are disposed. The camera 180 captures image data representing an image of the seat 110, a CRS 199 disposed on the seat 110, and/or a user near the seat 110. The image data captured by the camera 180 can be used to determine whether a CRS 199 is properly coupled to the anchors 140 and/or whether a person is located within a predetermined distance of the anchors 140, as discussed below.

Each of the two force sensors 182 is coupled to a respective one of the anchors 140. Each force sensor 182 captures force data representing an exerted force applied to the anchor 140 to which the force sensor 182 is coupled. The force data captured by the force sensors 182 can be used to determine whether a CRS 199 is properly coupled to each of the anchors 140 and whether the system 100 is applying a sufficient force to the CRS 199 to rigidly couple the CRS 199 to the support frame 116 of the vehicle seat 110.

Although the system 100 shown in FIGS. 1A and 1B includes a camera 180, in other implementations, the image sensor is any imaging unit, such as a motion detector or a device capable of detecting waves of any wavelength (e.g., infrared, visible light, ultraviolet), or any other type of sensor capable of capturing image data that can be used to determine whether a CRS is properly coupled to the one or more anchors and/or whether a person is located within a predetermined distance of the one or more anchors. In some implementations, the system can include more than one imaging unit.

Although the system 100 shown in FIGS. 1A and 1B includes two force sensors 182, in other implementations, the system can include a strain sensor, a pressure sensor, or any sensor capable of capturing force data that can be used to detect whether the CRS is properly coupled to the anchors and/or whether the system is applying a sufficient force to the CRS to rigidly couple the CRS to the support frame of the vehicle seat. In some implementations, the system can include one or more force sensors.

As shown in FIGS. 1A and 1B, the controller 192 includes a processor 194 and a memory 196. The processor 194 is in electrical communication with the sensors 180, 182 and the memory 196. The memory 196 stores computer-readable instructions, and the processor 194 is configured to execute the computer-readable instructions based on the sensor data.

The computer-readable instructions included in the memory 196 shown in FIGS. 1A and 1B cause movement of the linear actuators 130 (or worm gears 232) to move the anchors 140 from the extended position to the retracted position. Once the processor 194 receives image data from the camera 180 and/or force sensor data from the force sensor 182, the processor 194 uses this data to determine whether to move the anchors 140 from the extended position to the retracted position, or vice versa. The following examples illustrate how the processor 194 may use the image data and/or the force data to determine whether to move the anchors 140 between the extended position and the retracted position. These instructions may be used alone by the processor 194, or one or more of these instructions may be combined by the processor 194, according to various implementations.

The instructions cause the processor 194 to use the image data captured by the camera 180 to determine whether a CRS 199 is correctly positioned on the vehicle seat 110.

The instructions cause the processor 194 to use the image data captured by the camera 180 to determine whether a person is located within a predetermined distance of the anchors 140.

The instructions cause the processor 194 to use the force sensor data captured by the force sensors 182 to determine whether the CRS 199 is properly coupled to the anchors 140.

For example, in implementations in which all three of these instructions are used by the processor 194, the processor 194 causes the linear actuators 130 (or worm gears 232) to move the anchors 140 from the extended position to the retracted position in response to determining that the CRS 199 is correctly position in the seat 110, that a person is not located within the predetermined distance of the anchors 140, and/or that the CRS 199 is properly coupled to the anchors 140.

The memory may also include instructions for determining whether the CRS 199 is properly coupled to the anchors 140 and providing an indication of this determination to the user. For example, in some implementations, after the processor 194 moves the anchors 140 from the extended position to the retracted position, the instructions cause the processor 194 to receive force data from the force sensor 182 and determine whether the CRS 199 is properly coupled to the anchors 140 based on the received force sensor data. Based on this determination, the processor 194 generates an indication signal indicating whether the CRS 199 is properly coupled to the anchors 140. The indication signal indicating whether the CRS 199 is properly coupled to the anchors 140 can be any signal capable of being understood by a user that indicates the CRS 199 coupling status. For example, FIGS. 1A and 1B includes an indication light 160, a speaker 162, and a haptic feedback device 164. Once the processor 194 determines whether the CRS 199 is properly coupled to the anchors 140, the processor 194 generates and sends a signal to the indication light 160 to cause the light 160 to illuminate and/or change colors to provide a visible indication of the CRS 199 coupling status (e.g., a red light indicating that the CRS 199 is not properly coupled to the anchors 140 or a green light indicating that the CRS 199 is properly coupled to the anchors 140). The processor 194 also generates and sends a signal to the speaker 162 to cause the speaker 162 to generate an audible indication of the CRS 199 coupling status (e.g., words or different noises). The processor 194 further generates and sends a signal to the haptic feedback device 164 to cause the haptic feedback 164 device to generate a vibrational indication of the CRS 199 coupling status (e.g., different numbers of vibrations, different lengths of vibrations, different pattern of vibrations, or different amplitude and/or frequency of vibrations).

The memory may also include instructions that further cause the processor 194 to indicate whether the anchors 140 are in the extended position or the retracted position. The processor 194 can use the light 160, the speaker 162, the haptic device 164, or any combination thereof, to provide an indication of the position of the anchors 140 in a similar way as described above.

Although the system 100 shown in FIGS. 1A and 1B includes a light 160 to provide a visible indication, in other implementations, the system includes a moving indicator, a screen, or any other indicator capable of providing the user with a visible indication. Although the system 100 shown in FIGS. 1A and 1B includes a speaker 162 to provide an audible indication, in other implementations, the system includes a bell, a clicking device, or any other indicator capable of providing the user with an audible indication. Although the system 100 shown in FIGS. 1A and 1B includes a haptic feedback device 164 to provide a haptic indication, in other implementations, the system includes any other indicator capable of providing the user with a haptic indication.

The instructions also cause the processor 194 to use information from the vehicle to determine whether the CRS 199 coupled to the anchors 140 is in a safe condition to be uncoupled from the anchors 140. If the processor 194 determines that the CRS 199 is in a safe condition to be uncoupled from the anchors 140, the processor 194 moves the anchors 140 from the retracted position to the extended position. The information from the vehicle that the processor 194 uses to determine whether a CRS 199 coupled to the anchors 140 is in a safe condition to be uncoupled from the anchors 140 can include information such as whether the vehicle is located at its intended destination, whether the vehicle is stationary, whether the vehicle is in park, and/or any other information that would indicate that the CRS 199 could be safely uncoupled from the anchors 140. In some implementations, the system includes additional sensors to provide sensor data indicating whether a CRS coupled to the anchors is in a safe condition to be uncoupled from the anchors.

Once the processor 194 determines that the CRS 199 is in a safe condition to be uncoupled from the anchors 140 and moves the anchors 140 from the retracted position to the extended position, the processor 194 further generates and transmits a signal to the CRS 199 to cause the CRS 199 and/or the anchors 140 to uncouple from the other. If the CRS 199 is configured to receive a transmitted signal from the system 100, the signal causes the CRS 199 to automatically uncouple its attachment mechanisms (e.g., clips) from the anchors 140. The signal transmitted by the system 100 can be a wireless signal or a wired electrical signal.

In the implementations described above, the CRS includes attachment mechanisms, such as clips, and the anchoring system 100 includes one or more anchors to which the attachment mechanisms of the CRS can be coupled. In these implementations, the attachment mechanisms can include an actuator or motor to automatically release the attachment mechanisms of the CRS from the anchors of the anchoring system 100 in response to the processor determining that the CRS is in a safe condition to be uncoupled from the anchors.

The switch 150 is an electrical relay switch disposed on a portion of the seat 110 of the vehicle. The switch 150 allows a user to provide input to the processor 194 to cause the anchors 140 to move from the retracted position to the extended position, or vice versa. When the switch 150 is activated by a user, the switch 150 causes a signal to be sent to the processor 194, which causes the processor 194 to cause the drive system (e.g., linear actuators 130 or worm gears 232) to move the anchors 140 from the retracted position to the extended position, or vice versa. Although the switch 150 shown in FIGS. 1A and 1B is an electrical relay switch, in other implementations, the switch is a proximity switch, a touch screen, or any other type of switch capable of being activated (e.g., receiving input) by the user and sending a signal to the processor to cause movement of the anchors from the extended position to the retracted position, or vice versa. In some implementations, the camera and/or the force sensor can serve as the switch and be used by the user to provide an input to the processor to cause movement of the anchors from the extended position to the retracted position, or vice versa.

Although the features described and shown herein are located in specific locations and positions in a vehicle, in other implementations, features are located in any other location or position in the vehicle that still allow the systems to function as described.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," and "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A child restraint anchoring system, the system comprising:
    one or more anchors configured for coupling to a support frame of a vehicle seat, the one or more anchors being automatically movable between a retracted position and an extended position, wherein the one or more anchors are closer to the support frame in the retracted position than in the extended position, and
    one or more linear actuators for coupling the one or more anchors to the support frame, wherein the one or more linear actuators cause the one or more anchors to move between the retracted position and the extended position.

2. The system of claim 1, wherein each of the one or more anchors comprises an ISOFIX U-bolt.

3. The system of claim 1, further comprising:
    at least one sensor; and
    a processor in electrical communication with the at least one sensor and a memory, wherein the processor executes computer-readable instructions stored on the memory, the instructions causing the processor to:
        receive sensor data from the at least one sensor,
        determine whether a child restraint system ("CRS") is properly coupled to the one or more anchors based on the received sensor data, and
        indicate whether the CRS is properly coupled to the one or more anchors.

4. The system of claim 3, wherein the indication of whether the CRS is properly coupled to the one or more anchors is an audible indication.

5. The system of claim 3, wherein the indication of whether the CRS is properly coupled to the one or more anchors is a visible indication.

6. The system of claim 3, wherein, after the instructions cause the processor to determine whether the CRS is properly coupled to the one or more anchors based on the received sensor data, the instructions further cause the processor to indicate whether the one or more anchors are in the extended position or the retracted position.

7. The system of claim 6, wherein the indication of the extended position or retracted position of the one or more anchors is an audible indication.

8. The system of claim 6, wherein the indication of the extended position or retracted position of the one or more anchors is a visible indication.

9. The system of claim 6, wherein the indication of the extended position or retracted position of the one or more anchors is a haptic indication.

10. The system of claim 3, wherein the at least one sensor comprises a force sensor.

11. The system of claim 3, wherein the at least one sensor comprises an imaging unit.

12. The system of claim 11, wherein the imaging unit comprises a camera.

13. The system of claim 1, wherein the one or more anchors are moved between the retracted position and the extended position in response to receiving input from a user.

14. The system of claim 1, further comprising:
    at least one sensor; and
    a processor in electrical communication with the at least one sensor and a memory, wherein the processor executes computer-readable instructions stored on the memory, the instructions causing the processor to:
        receive sensor data from the at least one sensor,
        determine whether a child restraint system ("CRS") is properly coupled to the one or more anchors based on the received sensor data, and
        in response to the CRS being properly coupled to the one or more anchors, move the one or more anchors from the extended position to the retracted position.

15. The system of claim 14, wherein the system comprises at least one imaging unit, wherein the instructions cause the processor to further determine whether a person is located within a predetermined distance of the one or more anchors, and the instructions cause the processor to move the one or more anchors from the extended position to the retracted position only if the person is not located within the predetermined distance of the system.

16. The system of claim 15, wherein the imaging unit comprises a camera.

17. The system of any one of claims 14-16, wherein movement of the one or more anchors from the extended position to the retracted position rigidly couples the CRS to the seat.

18. The system of claim 1, further comprising a processor in electrical communication with a memory, wherein the processor executes computer-readable instructions stored on the memory, the instructions causing the processor to:
    determine whether a child restraint system ("CRS") coupled to the one or more anchors is in a safe condition to be uncoupled from the one or more anchors, and
    in response to the CRS being in a safe condition to be uncoupled from the one or more anchors, move the one or more anchors from the retracted position to the extended position.

19. The system of claim 18, wherein determining whether the CRS is in a safe condition to be uncoupled from the one or more anchors is based on whether a vehicle including the system is located at its intended destination.

20. The system of claim 18, wherein determining whether the CRS is in a safe condition to be uncoupled from the one or more anchors is based on whether a vehicle including the system is stationary.

21. The system of claim 18, wherein determining whether the CRS is in a safe condition to be uncoupled from the one or more anchors based is on whether the vehicle is in park.

22. The system of claim 1, further comprising a processor in electrical communication with a memory, wherein the processor executes computer-readable instructions stored on the memory, the instructions causing the processor to:
    determine whether a child restraint system ("CRS") coupled to the one or more anchors should be uncoupled from the one or more anchors, and in response to determining that the CRS should be uncoupled from the one or more anchors, cause the CRS and the one or more anchors to uncouple from each other.

23. The system of claim 22, wherein determining whether the CRS should be uncoupled from the one or more anchors is based on whether the vehicle is located at its intended destination.

24. The system of claim 22, wherein determining whether the CRS should be uncoupled from the one or more anchors is based on whether the vehicle is stationary.

25. The system of claim 22, wherein determining whether the CRS should be uncoupled from the one or more anchors is based on whether the vehicle is in park.

26. The system of claim 22, wherein the system transmits a signal to the CRS to cause the CRS and the one or more anchors to uncouple from each other.

27. A child restraint anchoring system, the system comprising:
   one or more anchors configured for coupling to a support frame of a vehicle seat, the one or more anchors being automatically movable between a retracted position and an extended position, wherein the one or more anchors are closer to the support frame in the retracted position than in the extended position, and
   one or more worm gear systems for coupling the one or more anchors to the support frame, wherein the one or more worm gear systems cause the one or more anchors to move between the retracted position and the extended position.

* * * * *